(12) United States Patent
Johnson

(10) Patent No.: US 6,361,836 B1
(45) Date of Patent: Mar. 26, 2002

(54) METHOD OF MAKING SPINNER DISCS FOR ROTARY FIBERIZATION PROCESSES

(75) Inventor: Walter A. Johnson, Aurora, CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/458,159

(22) Filed: Dec. 9, 1999

(51) Int. Cl.[7] .............................. B05D 3/06; B05D 3/02; C23C 8/10; C23C 8/36
(52) U.S. Cl. ................ 427/534; 427/255.4; 427/255.19; 427/255.31; 134/1.1; 148/284; 148/286; 148/674
(58) Field of Search .......................... 427/534, 255.19, 427/255.4, 255.31; 134/1.1; 148/277, 284, 286, 605, 606, 674; 216/8, 67

(56) References Cited

U.S. PATENT DOCUMENTS

| | | | | |
|---|---|---|---|---|
| 3,047,382 A | * | 7/1962 | Harpster | 148/674 |
| 3,276,903 A | * | 10/1966 | Galmiche | 148/674 |
| 4,475,794 A | * | 10/1984 | Baker et al. | 427/534 |
| 4,708,848 A | * | 11/1987 | Lewis | 420/585 |
| 5,118,332 A | * | 6/1992 | Hinze | 65/6 |
| 5,270,081 A | * | 12/1993 | Manies et al | 427/534 |
| 5,628,831 A | * | 5/1997 | Williamson et al. | 134/1.1 |
| 5,679,411 A | * | 10/1997 | Hoppe | 427/530 |
| 5,882,423 A | * | 3/1999 | Linn et al. | 134/1.1 |
| 5,914,017 A | * | 6/1999 | Clarke | 134/1.1 |
| 6,095,160 A | * | 8/2000 | Chu | 134/1.1 |
| 6,128,929 A | * | 10/2000 | Peterson et al. | 65/521 |
| 6,266,979 B1 | * | 7/2001 | Johnson et al. | 65/302 |

* cited by examiner

Primary Examiner—Marianne Padgett
(74) Attorney, Agent, or Firm—Robert D. Touslee

(57) ABSTRACT

A method of making a spinner disc for a rotary fiberization process, such as but not limited to a glass fiberization process, includes: forming a spinner disc from an alloy that forms a protective oxide film on surfaces of the spinner disc exposed to the atmosphere; forming fiberizing holes in an annular peripheral sidewall of the spinner disc; and applying a plasma to a surface of the spinner disc to remove hydrocarbons and sulfurous compounds from the surface of the spinner disc which would otherwise reduce and/or react with and degrade the protective oxide film forming on the surface of the spinner disc when the spinner disc is exposed to the atmosphere. Preferably, the surface of the spinner disc is solvent cleaned subsequent to the formation of the fiberizing holes and prior to the application of the plasma; preferably, the plasma used to plasma clean the spinner disc is a low temperature plasma of charged particles; and the spinner disc is heat treated subsequent to applying the plasma to the surface of the spinner disc to form a strong continuous oxide film or films on the dean surface of the spinner disc and to strengthen the alloy.

4 Claims, 2 Drawing Sheets

METHOD OF MAKING SPINNER DISCS FOR ROTARY FIBERIZATION PROCESSES

BACKGROUND OF THE INVENTION

The present invention relates to a method of making a spinner disc for a rotary fiberization process, such as but not limited to a glass fiberization process, and, in particular, to a method which includes: forming a spinner disc from an alloy that forms a protective oxide film or films on surfaces of the alloy exposed to the atmosphere; and plasma treating a surface of the spinner disc with charged particles to remove hydrocarbons and sulfurous compounds from the surface of the spinner disc which would otherwise reduce and/or react with and degrade the protective oxide film(s) forming on the surface of the spinner disc when the spinner disc is exposed to the atmosphere.

Elevated temperature resistant alloys such as but not limited to stainless iron, nickel and cobalt alloys are typically used as the alloys for spinner discs in elevated temperature rotary fiberization processes such as glass fiberization processes. In rotary glass fiberization processes, spinner discs made from these elevated temperature resistant alloys typically operate at temperatures of about 1800° F. and greater. The cobalt alloys are normally preferred for this application because of the superior performance of such cobalt alloys in this application when compared to iron or nickel based alloys. The superior performance of the cobalt alloys is due to their higher strength and creep resistance at the elevated temperatures used in rotary glass fiberization processes and their greater corrosion resistance at the elevated temperatures used in rotary glass fiberization processes.

These elevated temperature resistant alloys, e.g. stainless iron, nickel and cobalt alloys, when exposed to the air or atmosphere, form thin continuous, protective oxide films, such as but not limited to a strong, thin and continuous $Cr_2O_3$ barrier film, that protect the alloys from corrosion. The formation of high quality continuous oxide films with overall good integrity on the surfaces of the spinner discs is essential for superior corrosion resistance.

In the fabrication of the spinner discs used in rotary glass fiberization processes, typically, the spinner discs are cast. The surfaces of spinner disc castings are then machined and fiberizing holes are drilled, e.g. twist, electron beam, laser, EDM, etc., through the annular peripheral sidewalls of the spinner discs. After the spinner disc castings have been machined and the fiberizing holes have been drilled, the spinner discs are solvent cleaned and dried to remove the bulk of the hydrocarbon and sulfurous contaminants typically present on the surfaces of the spinner discs at this point of the manufacturing process. The spinner discs are then heat treated to build up a protective oxide film or films on the surfaces of the spinner discs and to strengthen the alloy, prior to being put into operation.

While the above described process removes the bulk of the hydrocarbon and sulfurous contaminants from the surfaces of the spinner discs, trace quantities of hydrocarbon and sulfurous contaminants remain on the surfaces of the spinner discs after solvent cleaning. The protective oxide films which form on these elevated temperature resistant alloys are adversely affected by these trace quantities of hydrocarbon and sulfurous contaminants on the alloy surface which volatilize, decompose and interact with the oxide films upon heating. For example, partially combusted hydrocarbons will locally reduce oxide films such as $Cr_2O_3$ (the predominant protective film formed on stainless iron, nickel and cobalt alloys) and sulfurous contaminant compounds will react with the oxide films and breach the oxide films allowing the sulfurous contaminant compounds to react with the underlying metal alloys to form low melting sulfides which further degrade the oxide films and the underlying metal alloys that the films are attempting to protect. Thus, there has remained a need to further reduce the hydrocarbon and sulfurous contaminants present on these spinner discs to enhance the formation of oxide films and the integrity of oxide films on the surfaces of the spinner disc to better protect the alloys of the spinner disc from corrosion which may lead to longer service lives for the spinner discs and reduced production costs.

SUMMARY OF THE INVENTION

The method of the present invention for making spinner discs for high temperature rotary fiberization processes provides a cost effective method for removing hydrocarbon and sulfurous contaminants from the surfaces of the spinner discs to enhance the formation of better quality protective oxide films on those surfaces after the spinner discs have been fabricated and fiberizing holes formed in the annular peripheral sidewalls of the spinner discs. The method of the present invention includes: forming a spinner disc from an alloy that forms a protective oxide film or films on surfaces of the spinner disc exposed to the atmosphere; forming fiberizing holes in an annular peripheral sidewall of the spinner disc; and applying a plasma to a surface of the spinner disc to remove hydrocarbons and sulfurous compounds from the surface of the spinner disc which would otherwise reduce and/or react with and degrade the protective oxide film or films forming on the surface of the spinner disc when the spinner disc is exposed to the atmosphere (glow discharge cleaning). Preferably, the surface of the spinner disc is solvent cleaned subsequent to the formation of the fiberizing holes and prior to the application of the plasma. The protective oxide film or films form much more rapidly and with greater integrity on the surface of the spinner disc at higher temperatures, e.g. temperatures above 1100° F. Accordingly, to minimize or reduce the formation of the protective oxide film or films while the hydrocarbon and sulfurous contaminants are being removed from the surface of the spinner disc by the plasma or glow discharge cleaning treatment of the present invention, preferably, the plasma used to remove the hydrocarbon and sulfurous contaminants from the spinner disc surface is a low temperature plasma of charged particles having a fluorescent light bulb component or plasma source with a temperature only slightly above ambient temperature. Subsequent to removing hydrocarbon and sulfurous contaminants from the spinner disc surface by applying the plasma to the surface of the spinner disc, the spinner disc is heat treated to form a strong continuous oxide film or films on the clean surface of the spinner disc and to strengthen the alloy.

DESCRIPTION OF THE PREFERRED EMBODIMENTS

Figure 1:
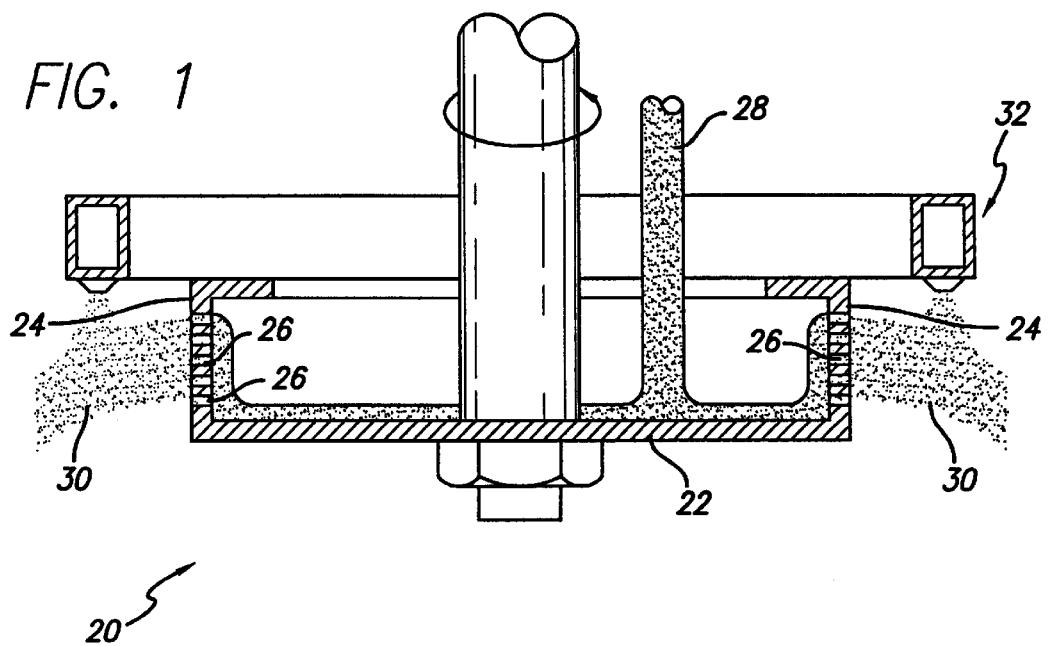
FIG. 1 is a schematic vertical cross section through a fiberizing station in a production line.

The spinner discs 20 of the present invention are especially suited for fiberizing molten thermoplastic fiberizable materials, such as but not limited to glass, into fibers in elevated temperature (e.g. operating temperatures of about 1800° F. and greater) rotary fiberizing processes. As shown in FIG. 1, a spinner disc 20 for fiberizing molten thermoplastic fiberizable materials in a rotary fiberizing process typically has a bottom disc plate 22 and an annular peripheral sidewall 24 integral with and extending upward from the bottom disc plate. The annular peripheral sidewall 24 has a plurality of rows of fiberizing holes 26 therein through which the molten thermoplastic fiberizable material, e.g. glass 28, is passed by centrifugal force to form glass fibers 30. Typically, the fibers 30 produced by passing the molten glass through the rows of fiberizing holes 26 in the spinner disc 20 are further attenuated by an annular curtain of hot, high velocity products of combustion and/or a high velocity annular curtain of air, steam, etc., discharged from an annular burner or manifold assembly and/or an annular air ring 32.

The spinner discs 20 can be made from various elevated temperature resistant alloys that form protective oxide films on their surfaces when exposed to the air or the atmosphere, such as but not limited to elevated temperature resistant stainless iron, nickel and cobalt alloys. While other alloys can be used, the compositions of preferred elevated temperature resistant cobalt alloys which can be used to form the spinner discs 20 of the present invention fall within the following ranges, in percentage by weight, cobalt (Co) 22.0–54.0; chromium (Cr) 30.0–34.0; nickel (Ni) 9.0–31.0; molybdenum (Mo) 0.0–7.0; carbon (C) 0.45–0.65; silicon (Si) 0.25–1.0; manganese (Mn) 0.30–0.80; precious metals (PM) 0.0–2.0; and carbide forming metals (CFM) 0.0–1.3. As used herein, including the claims, the term "precious metals" or "PM" means precious metals and rare earth elements and combinations thereof, such as but are not limited to, the following precious metals: ruthenium (Ru), rhodium (Rh), palladium (Pd), silver (Ag), platinum (Pt), gold (Au), and iridium (Ir) and the following rare earth metals: cerium (Ce), lanthanum (La), praseodymium (Pr), Yttrium (Y), and neodymium (Nd). As used herein, including the claims, the term "carbide forming metals" or "CFM" means carbide forming metals and combinations thereof, such as but not limited to, titanium (Ti), niobium (Nb), wolfram or tungsten (W), zirconium (Zr), hafnium (Hf), tantalum (ta), and vanadium (M).

Figure 2:
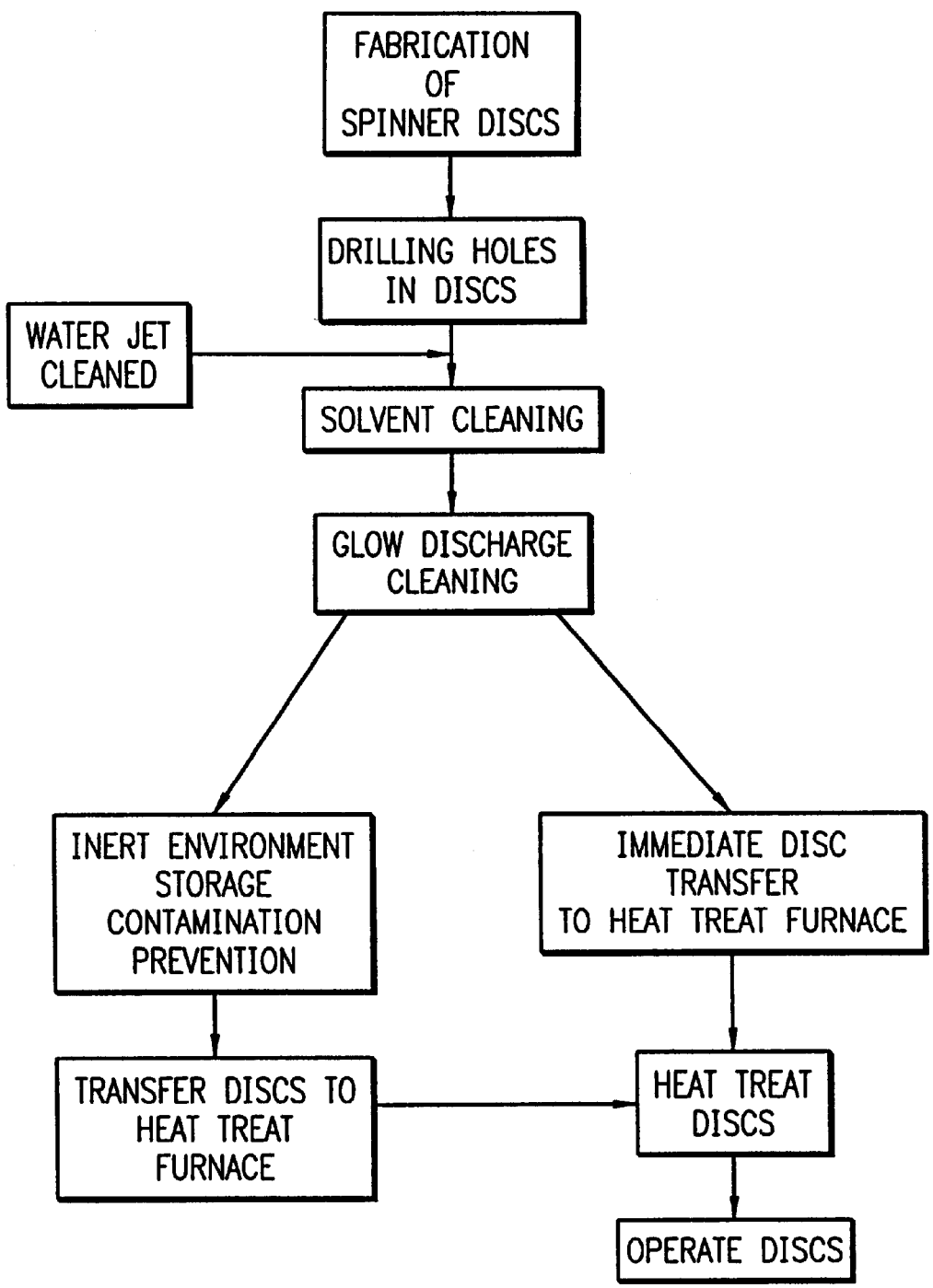
FIG. 2 is a flow process chart of the method of the present invention.

In the method of the present invention shown in the flow process chart of FIG. 2, the spinner disc 20 is fabricated, typically by casting, from an elevated temperature resistant alloy that forms a protective oxide film or protective oxide films on the surface of the spinner disc when the alloy is exposed to the air or the atmosphere. As discussed above high temperature resistant alloys which can be used to form the spinner disc 20 include but are not limited to elevated temperature resistant stainless iron, nickel and cobalt alloys. Fiberizing holes 26, typically numbering in the thousands to tens of thousands and ranging in diameter from about 0.010 inches to about 0.030 inches, are formed in the annular peripheral sidewall 24 of the spinner disc 20 by commercially available drilling methods, such as twist, electron beam, laser, EDM, etc. The fabrication of the spinner disc 20 with its fiberizing holes 26 leaves a residue of hydrocarbon and/or sulfurous contaminants on the surface of the spinner disc 20.

Preferably, the spinner disc 20 is solvent cleaned subsequent to the formation of the fiberizing holes 26 in the annular peripheral sidewall 24 of the spinner disc 20 to remove the bulk of the hydrocarbon and/or sulfurous contaminants from the surface of the spinner disc, including the surfaces of the fiberizing holes 26 in the annular peripheral sidewall 24 of the spinner disc. Examples of the solvents which can be used to dean the spinner disc are water, soap and water, ethanol, methanol and other solvents capable of dissolving hydrocarbon and/or sulfurous contaminants. As shown in FIG. 2, the solvent cleaning of the spinner disc 20 can include the application of a solvent jet or solvent jets, e.g. water or soap and water jet(s), to the surfaces of the spinner disc 20 including the surfaces of the fiberizing holes 26 at pressures sufficient to facilitate the removal of the hydrocarbon and/or sulfurous contaminants from the spinner surfaces contacted by the jet(s). The solvent cleaning can also include soaking the spinner disc 20 in a solvent bath for a period of time. Subsequent to the solvent cleaning, if performed, the spinner disc is dried.

Next, the spinner disc 20 is plasma or glow discharge cleaned by applying a stream or streams of charged particles (positive and negative ions) emanating from a bulb component or source, similar to a fluorescent bulb, to the surface of the spinner disc, including the surfaces of the fiberizing holes 26. The plasma vaporizes or arcs off hydrocarbon and sulfurous contaminants present on the surface of the spinner disc including the surfaces of the fiberizing holes. While typically the entire surface of the spinner disc would be plasma or glow discharge treated, it is especially important to plasma treat the inner and outer surfaces of the annular sidewall 24 and the surfaces of the fiberizing holes 26 passing through the annular sidewall 24. Otherwise the corrosion of the surfaces of the fiberizing holes 26 can prematurely increase the diameter of the fiberizing holes and adversely affect the fiberizing process.

The protective oxide film or films form much more rapidly and with greater integrity at higher temperatures, e.g. temperatures above 1100° F. Accordingly, to minimize or reduce the formation of the protective oxide film or films while the hydrocarbon and sulfurous contaminants are being removed from the surface of the spinner disc 20 by the plasma or glow discharge treatment of the present invention, preferably, the plasma used to remove the hydrocarbon and sulfurous contaminants from the spinner disc surface is a low temperature plasma of charged particles with the fluorescent light bulb component or plasma source discharging the charged particles having a nominal temperature only slightly in excess of ambient temperature.

After the spinner disc 20 has been plasma or glow discharge treated, the spinner disc 20 is preferably placed in an inert environment storage to prevent contamination or heat treated in a heat treatment furnace at a temperature and length of time to promote the formation of the strong continuous protective oxide film or films on the dean surface of the spinner disc 20 and to strengthen the alloy (e.g. a temperature in excess of 1300° F. for about one hour or longer) and placed in operation. If the spinner disc 20 in placed in an inert environment storage to prevent contamination, without first being heat treated, the spinner disc 20 is heat treated after and, preferably, immediately after the removal of the spinner disc 20 from the inert environment storage and prior to being placed into operation.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of making a spinner disc for a rotary fiberization process having operating temperatures of about 1800° F. and greater, comprising:

forming the spinner disc with a bottom wall and an annular peripheral sidewall extending upward from an annular periphery of the bottom wall; the annular peripheral sidewall of the spinner disc having an outer surface and an inner surface; the spinner disc being formed from an alloy that forms a protective oxide film on surfaces of the alloy exposed to the atmosphere;

forming fiberizing holes in the annular peripheral sidewall of the spinner disc;

cleaning the inner and outer surfaces of the annular peripheral sidewall of the spinner disc and surfaces of the fiberizing holes in the annular peripheral sidewall of the spinner disc with a solvent to partially remove hydrocarbon and/or sulfurous contaminants;

drying the inner and outer surfaces of the annular peripheral sidewall of the spinner disc and the surfaces of the fiberizing holes subsequent to the cleaning;

applying a plasma of charged particles to the inner and outer surfaces of the annular peripheral sidewall of the spinner disc and to the surfaces of the fiberizing holes in the annular peripheral sidewall of the spinner disc to further remove hydrocarbons and/or sulfurous contaminants from the inner and outer surfaces of the annular peripheral sidewall of the spinner disc and from the surfaces of the fiberizing holes in the annular peripheral sidewall of the spinner disc which would otherwise reduce and/or react with and degrade the protective oxide film forming on the surface of the spinner disc when the spinner disc is exposed to the atmosphere; and heat treating the spinner disc at temperatures in excess of 1300° F., subsequent to applying the plasma to the inner and outer surfaces of the annular peripheral sidewall of the spinner disc and the fiberizing holes in the annular peripheral sidewall of the spinner disc, to promote the formation of the protective oxide film and strengthen the alloy.

2. The method of making a spinner disc for a rotary fiberization process according to claim 1, wherein:

the plasma applied to the surface of the spinner disc is emitted from a fluorescent light source.

3. The method of making a spinner disc for a rotary fiberization process according to claim 1, wherein:

the solvent cleaning of the inner and outer surfaces of the annular peripheral sidewall of the spinner disc and the surfaces of the fiberizing holes in the annular peripheral sidewall of the spinner disc includes applying a water jet to the surface.

4. The method of making a spinner disc for a rotary fiberization process according to claim 1, wherein:

the alloy is a cobalt alloy comprising, in percentage by weight, cobalt (Co) 22.0–54.0; chromium (Cr) 30.0–34.0; nickel (Ni) 9.0–31.0; molybdenum (Mo) 0.0–7.0; carbon (C) 0.45–0.65; silicon (Si) 0.25–1.0; manganese (Mn) 0.30–0.80; precious metals (PM) 0.0–2.0; and carbide forming metals (CFM) 0.0–1.3.

* * * * *